US005507090A

United States Patent [19]
Shipley et al.

[11] Patent Number: 5,507,090
[45] Date of Patent: Apr. 16, 1996

[54] METHOD FOR MAKING STRESS SENSORS

[75] Inventors: John Shipley, Tremonton; Lloyd T. Johnson, Perry; Michael C. Harding, Spanish Fork; Boyd D. Bryner, Brigham City, all of Utah

[73] Assignee: Thiokol Corporation, Ogden, Utah

[21] Appl. No.: 278,028

[22] Filed: Jul. 20, 1994

[51] Int. Cl.⁶ .............................. H01C 17/28; B23P 17/00
[52] U.S. Cl. ........................... 29/621.1; 29/411; 29/419.2
[58] Field of Search ..................... 29/621.1, 411, 29/419.2; 73/720, 721, 726, 727; 338/2, 3, 4

[56] References Cited

U.S. PATENT DOCUMENTS

| | | | |
|---|---|---|---|
| 3,428,933 | 2/1969 | Gerstenberger | 338/2 |
| 3,434,090 | 3/1969 | Chelner | 338/4 |
| 3,918,019 | 11/1975 | Nunn | 338/42 |
| 4,079,508 | 3/1978 | Nunn | 29/580 |
| 4,317,126 | 2/1982 | Gragg, Jr. | 357/36 |
| 4,327,350 | 4/1982 | Erichsen | 338/4 |
| 4,467,656 | 8/1984 | Mallon et al. | 73/727 |
| 4,481,497 | 11/1984 | Kurtz et al. | 338/2 |
| 4,802,952 | 2/1989 | Kobori et al. | 29/621.1 |
| 5,369,875 | 12/1994 | Utsunomiya et al. | 29/621.1 |

FOREIGN PATENT DOCUMENTS

| | | | |
|---|---|---|---|
| 59-46830 | 3/1984 | Japan | 73/720 |

OTHER PUBLICATIONS

"Pressure Transducers: LQ-5-80 Series," Kulite Semiconductor Products, Inc., 1989.
"Curite Process Pressure Sensors," Interlink Electronics, Apr. 1991.

*Primary Examiner*—P. W. Echols
*Attorney, Agent, or Firm*—Madson & Metcalf; Ronald L. Lyons

[57] ABSTRACT

A method for making a plurality of stress sensors includes creation of cavities and corresponding diaphragms in a thin metal front plate, preferably by an acid etching process. A thin back plate, preferably comprising metal, is secured to the front plate over the cavities, preferably by welding. A plurality of strain gages is bonded to the diaphragms in the front plate with a layer of bonding agent such as epoxy. The bond layer is of substantially uniform thickness on at least that portion of the front plate where the diaphragms are located. As the bond layer cures, a magnetic force is applied to the diaphragms to reduce their movement toward the back plate, and to thereby assist in creating a bond layer of substantially uniform thickness near the diaphragms. A suitable magnetic force may be applied by positioning a rare earth magnet near the diaphragms. The magnetic force may be supplemented by a mechanical force. The method may further comprise the step of calibrating a plurality of the stress sensors with an automated calibration system. The present method provides a stress sensor whose total thickness is approximately 0.015 inches, and preferably only about 0.010 inches.

22 Claims, 8 Drawing Sheets

METHOD FOR MAKING STRESS SENSORS

FIELD OF THE INVENTION

The present invention relates to a method for making stress sensors, and more particularly to a method for making a plurality of thin stress sensors suitable for use in monitoring composite and elastomer manufacturing processes.

TECHNICAL BACKGROUND OF THE INVENTION

It is often desirable to measure stress during the manufacture of pressure vessels, rocket motors, pipes, and other goods which comprise composite materials. One method of making such composite structures is to wind resin-carrying reinforcing fibers in layers around a mandrel. The fibers carry a resin which bonds the fibers together after a curing process. Curing involves polymerization of the resin such that a solid matrix is formed around the fibers.

Typical composite structures are substantially weakened if gaps or other unbonded regions arise between adjacent layers of fiber. In a pressure vessel, such weaknesses can be catastrophic. To assist in obtaining adequate bonding, each new layer of fiber is therefore compressed against the previous layer as it is wound about the mandrel.

Accordingly, it is often desirable to monitor the winding process by measuring the stress between the layers of a composite structure as the fibers are being wound. Additional stress measurements are often taken while the composite structure is being cured. Stress measurements are also used to monitor other processes for manufacturing composite structures, including resin transfer molding, compression molding, pultrusion, and vacuum bagging.

Stress is measured by devices that are configured to measure the force which is acting against an area. Such devices are collectively referred to herein as "stress sensors." Stress sensors may be configured to measure either uniform or nonuniform forces, and may measure compression forces, tension forces, or both. Stress sensors which measure uniform forces per unit area are typically known as pressure sensors or pressure transducers.

A stress sensor suitable for use in monitoring the manufacture of composite structures faces several requirements. In many situations, the desired stress measurements can be obtained only by permanently embedding dozens or even hundreds of stress sensors within each composite structure as the structure is being formed. Thus, stress sensors used in such applications should be relatively inexpensive and easily produced in large numbers.

In addition, stress sensors embedded in composite structures made by fiber winding should be relatively thin. Placing a stress sensor between adjacent layers of fiber in a structure typically causes a "tenting" effect by raising the upper layer above the lower layer. The sensor raises the upper layer not merely where the upper layer rests directly on the sensor, but also in a region around the sensor, thereby creating a gap between the upper and lower layers.

The size of the gap depends largely on the sensor's thickness. Thinner sensors are generally preferable because they reduce the size of the gap. A stress sensor intended for use in monitoring fiber winding should typically be no thicker than about 0.015 inches and preferably no thicker than about 0.010 inches.

Each stress sensor should also be calibrated to provide accurate measurements of stresses in an appropriate range. Stress sensors used to monitor fiber winding and autoclave curing during composite manufacturing should provide measurements in a rated range up to about 400 p.s.i., and preferably in a rated range up to about 500 p.s.i., with an error of no more than about 20 percent of the highest rated output ("full scale" output) without temperature compensation, and preferably with an error of no more than about five percent of full scale output with temperature compensation.

One type of stress sensor known in the art for monitoring fiber winding comprises an arrangement of strain sensitive electrical resistors (strain gauges) secured to a circular diaphragm which is positioned adjacent a cavity. The resistors are configured to receive an electrical energy input and to provide an output voltage, proportional to strain in the diaphragm, which can be read by external equipment. The resistors are arranged on the diaphragm such that movement of the diaphragm into the cavity, in response to a force applied to the sensor, modifies the resistance of the resistors and thereby causes a change in the output voltage. The graph of the output voltage as a function of stress is substantially linear over the rated stress range of the stress sensor. Thus, within the rated range, a change in the output voltage directly corresponds to a change in the stress on the diaphragm.

However, many stress sensors of this general design fail to satisfy the requirements set forth above for stress sensors used to monitor composite manufacturing. Use of such sensors is limited by their thickness, limited accuracy and range, high cost, or some combination of these factors. Some of these drawbacks arise from the methods which are used to make the stress sensors.

For instance, stress sensors that include hand-wired electrical connections are difficult to make in large numbers, and therefore typically cost more per unit than functionally equivalent sensors which were made without hand-wiring. Similarly, manufacturing sensors in groups is preferable to making them one at a time, because more sensors are produced in less time at a lower cost per sensor.

The accuracy of the stress sensor and the range over which the sensor is reliable may also depend on the method used to manufacture the sensor. The behavior curve which tracks the sensor's output voltage as a function of stress is ideally linear, or at least monotonic over some range. To obtain such regular behavior, the diaphragm must move smoothly. Within the specified range, gradual changes in the force against the diaphragm must cause correspondingly gradual changes in the position of the diaphragm. Gradual changes in the diaphragm position produce gradual changes in the resistance of the resistors, resulting in gradual changes in the voltage across the resistors that are secured to the diaphragm.

However, such regular behavior is often difficult to obtain if the electrical resistors are improperly secured or if the diaphragm contains irregularities. Under these circumstances, the diaphragm may lunge or "oil-can." That is, the diaphragm may reach a first position of increased resistance to stress and then lunge suddenly into a distant second position after the stress increases beyond some threshold. A diaphragm that lunges typically fails to produce a regular behavior curve.

Thus, it would be an advancement in the art to provide a method for making stress sensors which are calibrated to provide accurate stress measurements in a range that is appropriate for sensing the stresses present while composite structures are manufactured.

It would be a further advancement to provide such a method for making stress sensors which are thinner than pre-existing stress sensors.

It would also be an advancement in the art to provide such a method for making stress sensors which are less expensive than pre-existing stress sensors.

It would be an additional advancement to provide such a method for easily making a large number of stress sensors.

Such a method is disclosed and claimed herein.

BRIEF SUMMARY OF THE INVENTION

The present invention provides a method for making a plurality of stress sensors. According to the method of the present invention, cavities are created at a plurality of predetermined locations in a thin metal front plate. A presently preferred front plate is formed of steel shim stock approximately half the thickness of the finished sensor.

It is presently preferred that the cavities be created by masking the front plate outside the predetermined cavity locations and then applying acid to the predetermined locations to etch the cavities into the plate. The cavities may also be produced by machining the front plate. Acid etching requires more time to produce cavities than machining, but etching produces thinner diaphragms which are free of the irregularities caused by straining or fatiguing the front plate during machining. In some stress sensors, such irregularities contribute to lunging, rupturing, and other undesirable diaphragm behaviors.

A thin back plate is secured to the cavity side of the front plate such that the cavities in the front plate are covered by the back plate. It is presently preferred that the back plate comprise metal, such as steel shim stock, and that the back plate be secured to the front plate by welding the two plates together. Securement by an annulus of solder or of a high temperature adhesive instead of welding, or in addition to welding, is preferred for stress sensors intended for use in measuring tension forces in relatively low temperature environments.

Next, a layer of bonding agent is applied to the diaphragm side of the front plate. A sheet containing a plurality of strain gages is then laid on the front plate such that each cavity location corresponds in position to a strain gage. The bonding agent is then cured, thereby securing each strain gage to its corresponding diaphragm. It is presently preferred to utilize strain gages manufactured in an array by conventional means and supplied for use with the present method. Given such an array, the cavity locations are chosen to correspond to the positions of the strain gages in the array.

To reduce the risk that the diaphragm will lunge, the cured bond layer has a substantially uniform thickness on at least that portion of the front plate where the diaphragms are located. It is presently preferred to use a liquid bonding agent such as epoxy. As the bonding agent cures, the front plate and the sheet of strain gages are pressed against one another to ensure good adhesion. However, this pressure may cause undesirable deflection of the diaphragms into the cavities.

Therefore, a magnetic force is applied to the diaphragms as the bond layer cures. The magnetic force reduces movement of the diaphragms toward the back plate during the curing of the liquid bonding agent, and thereby assists in creating a bond layer of substantially uniform thickness near the diaphragms. A suitable magnetic force may be applied by positioning a rare earth magnet near the diaphragms. The magnetic force is optionally supplemented by mechanically applying a force that presses the strain gages toward the front plate.

The method of the present invention may further comprise the step of calibrating a plurality of the stress sensors with an automated calibration system. This calibrating step is accomplished by contacting electrical terminals of strain gages of the plurality of stress sensors with electrical probes of the automated calibration system. A predetermined electrical input is applied to the strain gages such that the gages produce an electrical output. Next, a predetermined stress is applied to the strain gages to alter the electrical output they produce. Then the automated calibration system is used to sense the electrical output produced by the strain gages in response to the known stress. The electrical output produced by the strain gages may be recorded for later use. Like other steps in the present method, the calibrating step is thus well-suited for mass production of stress sensors.

The present method provides a stress sensor whose total thickness is approximately the sum of the thicknesses of the back plate, front plate, bond layer, and strain gage. One embodiment of a stress sensor formed according to the method of the present invention has a total thickness of approximately 0.015 inches. However, it is contemplated that use of smaller diameter diaphragms and thinner strain gages according to the present method will make possible a sensor that is only about 0.010 inches thick.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide a selected embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
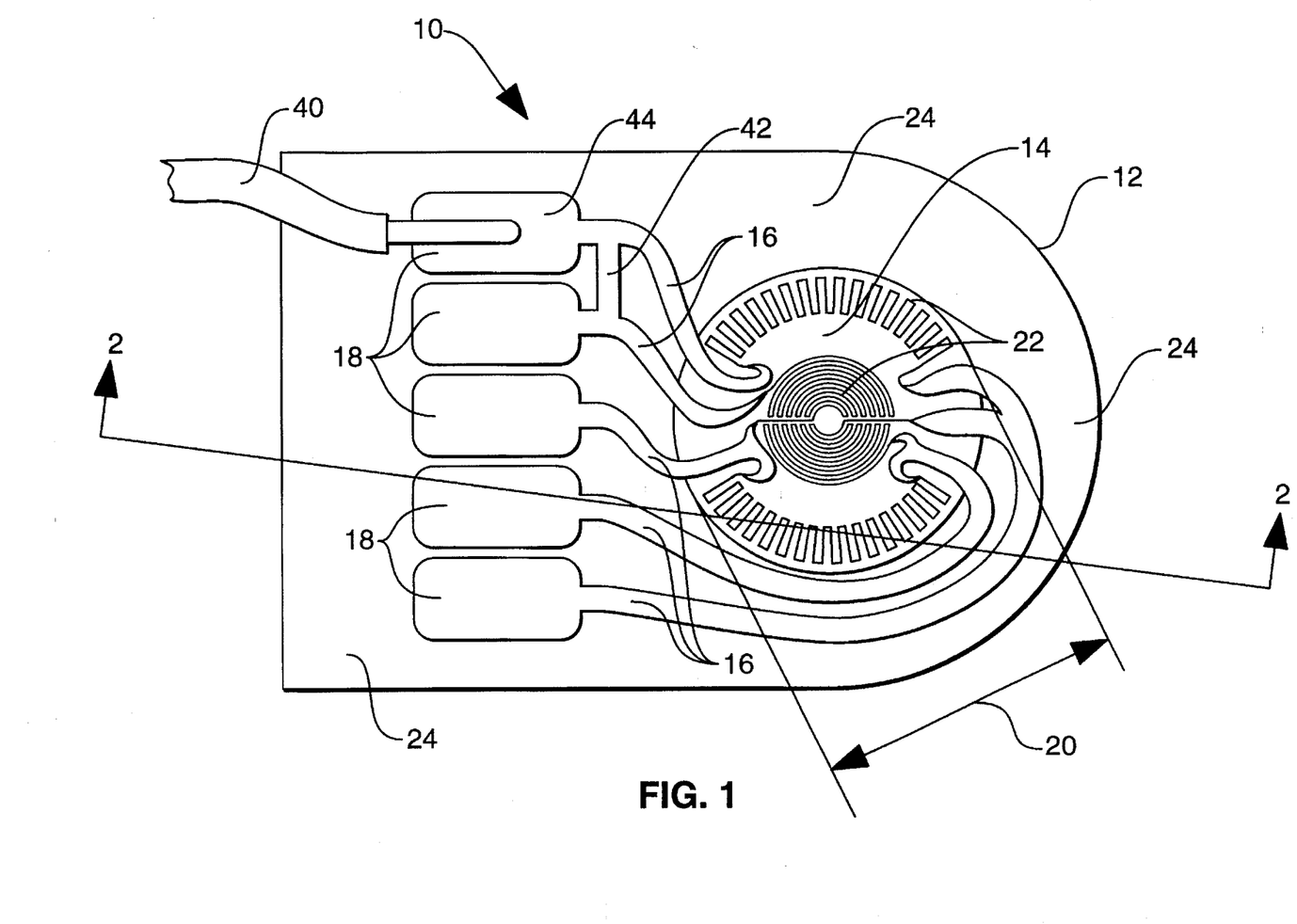
FIG. 1 is a top plan view of a presently preferred embodiment of a stress sensor made according to the method of the present invention.

Reference is now made to the figures wherein like parts are referred to by like numerals. The present invention relates to a method for making a plurality of stress sensors. A stress sensor formed according to a preferred method of the present invention is generally designated at 10 in FIGS. 1 and 2. As illustrated in FIG. 1, the stress sensor 10 includes a strain gage 12 which has an active area 14 electrically connected by leads 16 to large terminal pads 18. The active area 14, which has a diameter 20, includes electrical resistors 22 arranged in a Wheatstone bridge configuration. The active area 14, the leads 16, and the terminal pads 18 are secured to a strain gage carrier 24.

In the embodiment illustrated, the strain gage 12 includes flexible leads secured to a flexible carrier. This strain gage is preferably about 0.001 inches thick with an active area diameter of about 0.120 inches. One such preferred strain gage is available from J. P. Technologies of Upland, Calif.

Figure 2:
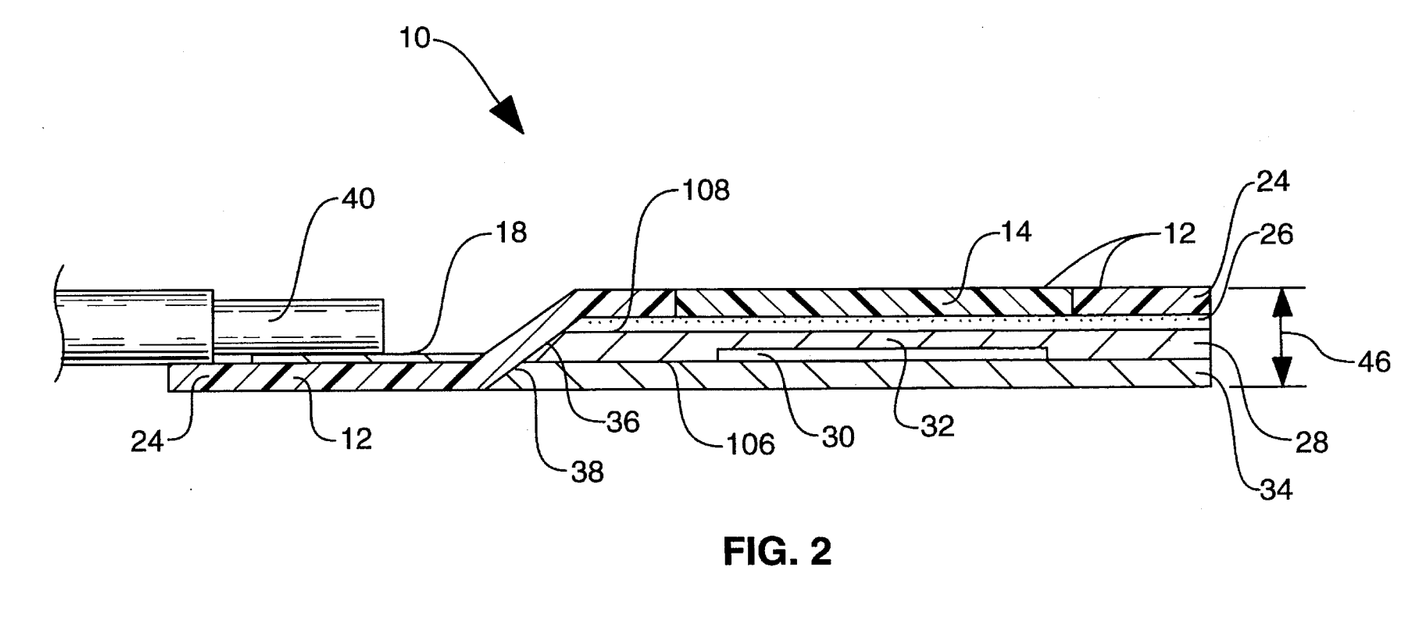
FIG. 2 is a cross-sectional side view taken along line 2—2 in FIG. 1.

As shown best in FIG. 2, the strain gage 12 is bonded by a bond layer 26 to a thin metal front plate 28. The front plate 28 is made of standard 0.005 inch steel shim stock. The metal front plate 28 is less than about 0.010 inches thick, and is preferably less than about 0.005 inches thick.

One suitable bond layer 26 is achieved by utilizing an epoxy adhesive. One presently preferred epoxy adhesive is the M-bond 610 adhesive available from Micro Measurements of Raleigh, N.C.

The metal front plate 28 has a cavity 30 which defines a diaphragm 32. In the embodiment illustrated, the cavity 30 has a depth of about 0.001 inches and a diameter of about 0.106 inches. Thus, the diaphragm 32 has a thickness of about 0.004 inches and a diameter of about 0.106 inches.

The front plate 28 is secured to a thin back plate 34 such that the back plate 34 covers the cavity 30. In this preferred embodiment, the front plate 28 is secured to the back plate 34 by welding them together. The back plate 34 is preferably made of 0.004 inch steel shim stock. The front plate 28 and the back plate 34 also preferably have beveled portions 36 and 38, respectively, to prevent the flexible leads 16 (FIG. 1) from being cut under stress. A bevel of about thirty degrees is currently preferred, but those of skill in the art will appreciate that other bevel angles may also be employed according to the present invention.

Alternatively, the front plate 28 is secured to the back plate 34 by an annulus of solder or of a high temperature adhesive. Suitable solders and suitable adhesives, such as high temperature epoxy, are well known in the art. Unlike tack or spot welding, such an annulus leaves no substantial portion of the plates 28, 34 unfastened near the cavity 30. Thus, such an annulus-bonded stress sensor 10 is adapted for use in measuring tension forces, such as the "pull away" forces that occur during cool down periods of fiber wound composite manufacturing. Such a stress sensor 10 is intended for use in measuring tension forces in relatively low temperature environments, that is, environments in which the solder or bond used are not likely to fail due to heat. Securement in this manner with an annulus may be used in place of, or in addition to, welding.

The front plate 28 and the back plate 34 are positioned short of the terminal pads 18 as shown in FIG. 2 to allow room for external leads to be soldered to the terminal pads 18. One such external lead 40 is illustrated in the Figures, it being understood that additional leads would be connected to the terminal pads 18 in configuration readily determined by those of skill in the art. In an alternative embodiment, the lead 42 (FIG. 1) is cut to free the terminal pad 44, thereby allowing the addition of conventional temperature compensation resistors to the strain gage 12.

The thickness of the bond layer 26, which is exaggerated for illustration in FIG. 2, is preferably negligible compared to the thickness of the strain gage 12, the front plate 28, or the back plate 34. Thus, the thickness 46 of the preferred embodiment of the stress sensor 10 is preferably no greater than about 0.010 inches.

Figure 3:
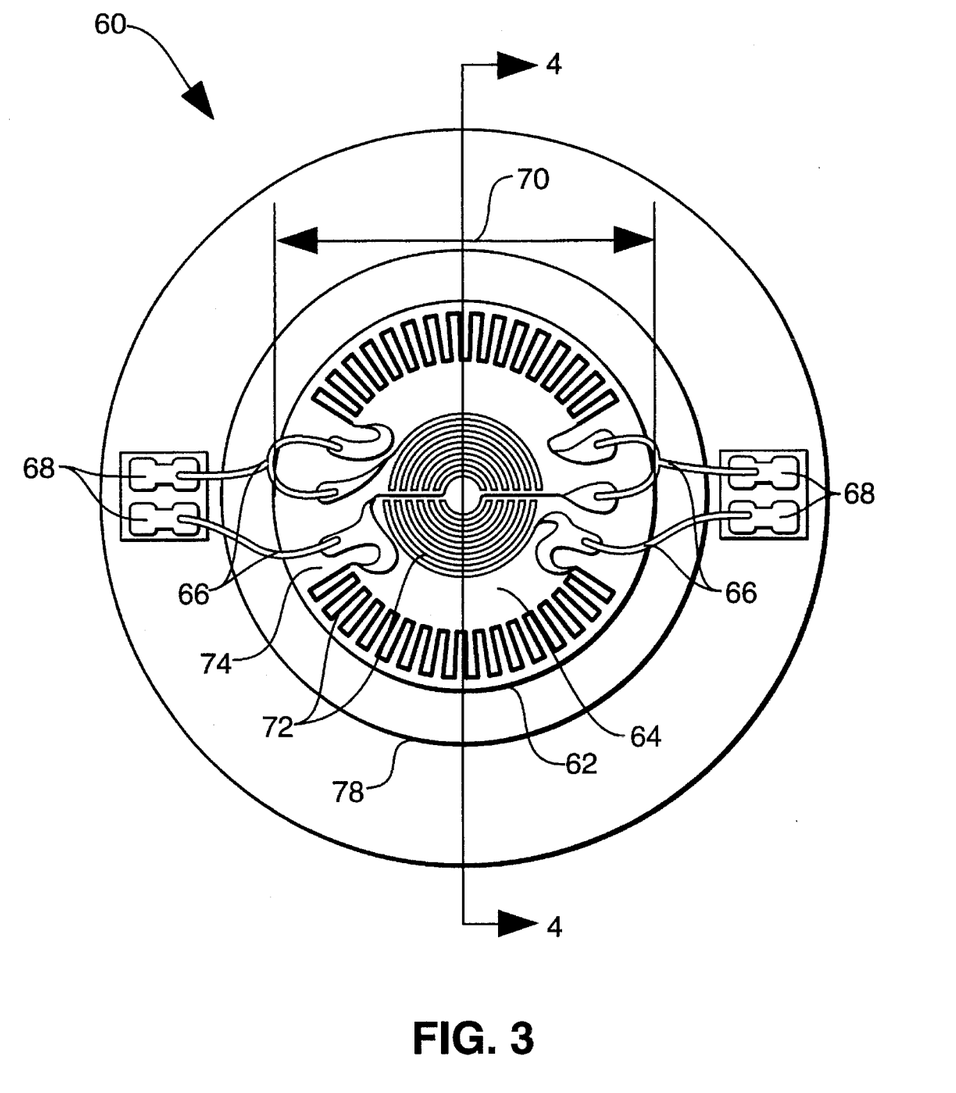
FIG. 3 is a top plan view of a stress sensor made according to an alternative method of the present invention.
Figure 4:
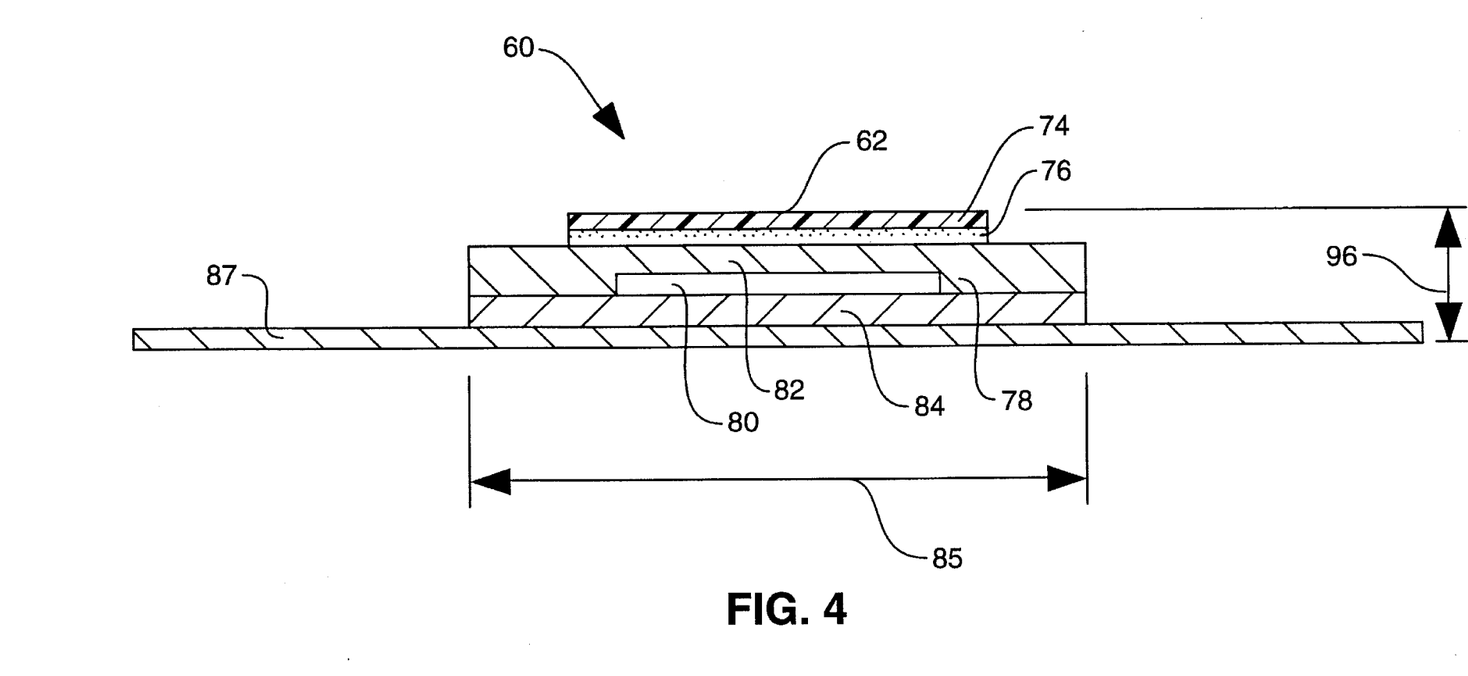
FIG. 4 is a cross-sectional side view taken along line 4—4 in FIG. 3.

FIGS. 3 and 4 illustrate an alternative embodiment of a stress sensor, indicated generally at 60, formed according to the method of the present invention. The stress sensor 60 includes a strain gage 62 which has an active area 64 electrically connected by leads 66 to large terminal pads 68. The active area 64, which has a diameter 70, includes electrically strain sensitive resistors 72 arranged in a Wheatstone bridge configuration. The active area 64, the leads 66, and the terminal pads 68 are secured to a strain gage carrier 74. In a prototype of the illustrated embodiment, the strain gage 62 is a model EA-06-182JB-350 full bridge diaphragm gage, available from Micro Measurements of Raleigh, N.C.

As shown best in FIG. 4, the strain gage 62 is bonded to a thin metal front plate 78 by a bond layer 76. The bond layer 76 is made of a bonding agent, and is preferably made of a bonding agent which is applied in liquid form and then cured to form a solid matrix through polymerization. One suitable bonding agent is M-bond 610 adhesive available from Micro Measurements of Raleigh, N.C.

The metal front plate 78 has a cavity 80 which defines a diaphragm 82. In the prototype of the illustrated embodiment, the front plate 78 comprises standard 0.008 inch stainless steel shim stock, and the cavity 80 has a depth of about 0.003 inches and a diameter of about 0.187 inches. Thus, the diaphragm 82 has a thickness of about 0.005 inches and a diameter of about 0.187 inches. It is contemplated that other metals than stainless steel, such as other steel alloys, may provide better performance.

The front plate 78 is secured to a thin back plate 84 such that the back plate 84 covers the cavity 80. In the prototype of the illustrated embodiment, the front plate 78 is resistance welded in eight places to a back plate 84 which comprises 0.005 inch steel shim stock. The front plate 78 and the back plate 84 in the prototype are configured substantially as circles, each having a diameter 85 of about 0.340 inches.

The back plate 84 and the terminal pads 68 are bonded to a base plate 87. In the prototype of the illustrated embodiment, the base plate 87 comprises a sheet of flexible material sold under the trade name KAPTON by E. I. Du Pont de Nemours and Co., and is about 0.001 inch thick. The thickness of the bond layer 76, which is exaggerated for illustration in FIG. 4, is preferably negligible compared to the thickness of the strain gage 62, the front plate 78, the back plate 84, and the base plate 87. Thus, the thickness 96 of the prototype of the illustrated stress sensor 60 is about 0.015 inches.

Figure 5:
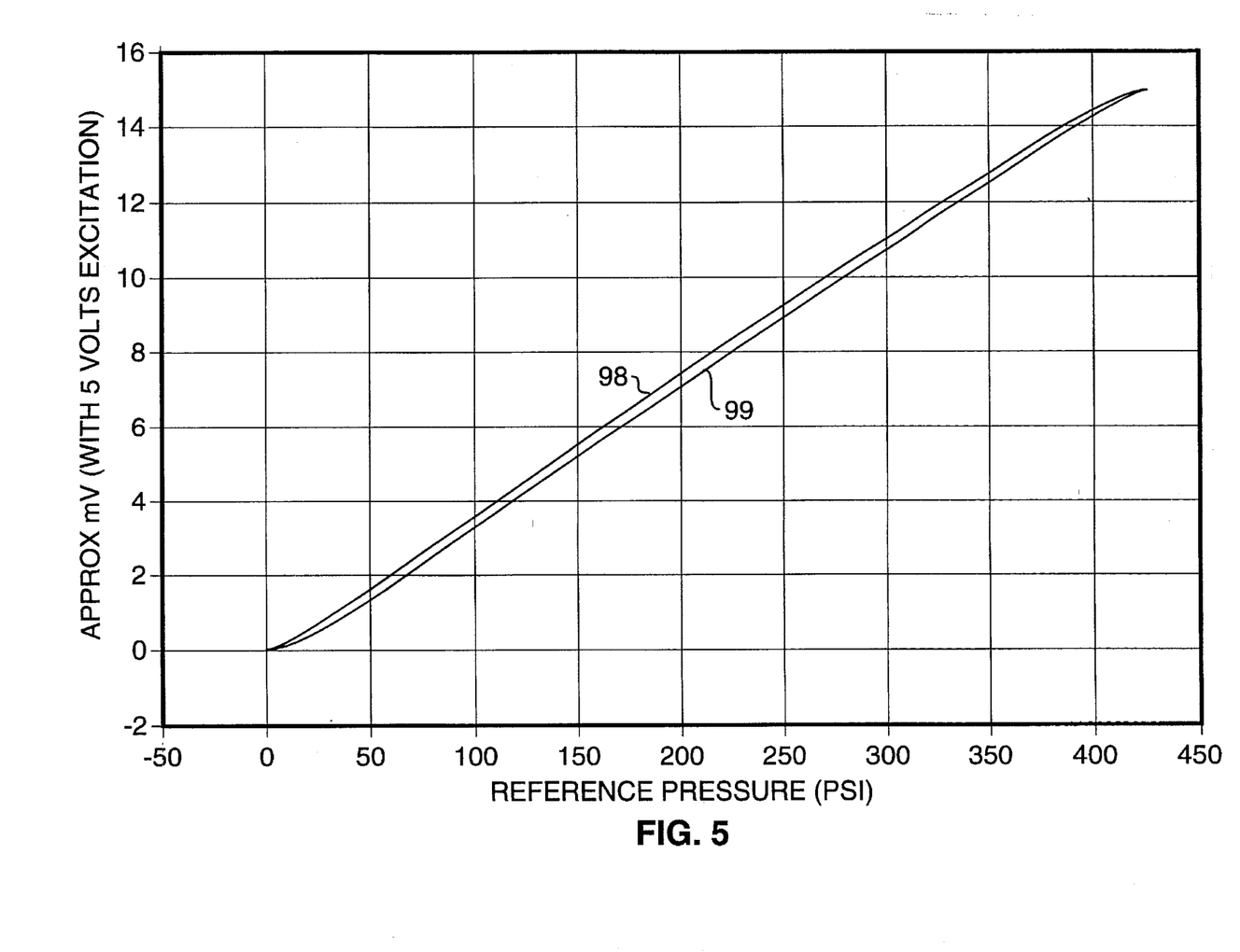
FIG. 5 is a graph of measured voltages illustrating the voltage outputs in response to an applied reference pressure for two prototypes of the stress sensor illustrated in FIGS. 3 and 4.

FIG. 5 illustrates the behavior of two prototypes of the illustrated stress sensor 60. Each prototype was connected to a five volt direct current power supply (not shown) and then covered by a slab of RTV silicone to simulate the embedding of the prototype between layers of a composite structure. Each prototype was then placed in a pressure chamber and subjected to reference pressures as indicated in FIG. 5. The electrical performance curve 98 tracks the output voltage of one prototype of the stress sensor 60 as the reference pressure was increased, while curve 99 tracks output voltage of the second prototype as the reference pressure was increased. The curves 98, 99 are substantially linear in the range from about zero to about 425 p.s.i. Linearity is approximately one percent of full scale output, and hysteresis is about two percent of full scale output. Thermal zero shift of this particular uncompensated prototype sensor was approximately 20 percent of full scale output. A 24-hour stability test indicated that the prototype's creep was less than 0.5 percent of full scale output after it stabilized from the initial temperature change. The sensitivity was approximately three mv/v.

The present invention includes a method for forming a plurality of stress sensors. Although the method is described with reference to the stress sensor 10 illustrated in FIG. 1, it will be appreciated by those of skill in the art that the scope of the present method also includes formation of the stress sensor 60 (FIG. 3), as well as formation of other stress sensors.

Figure 6:
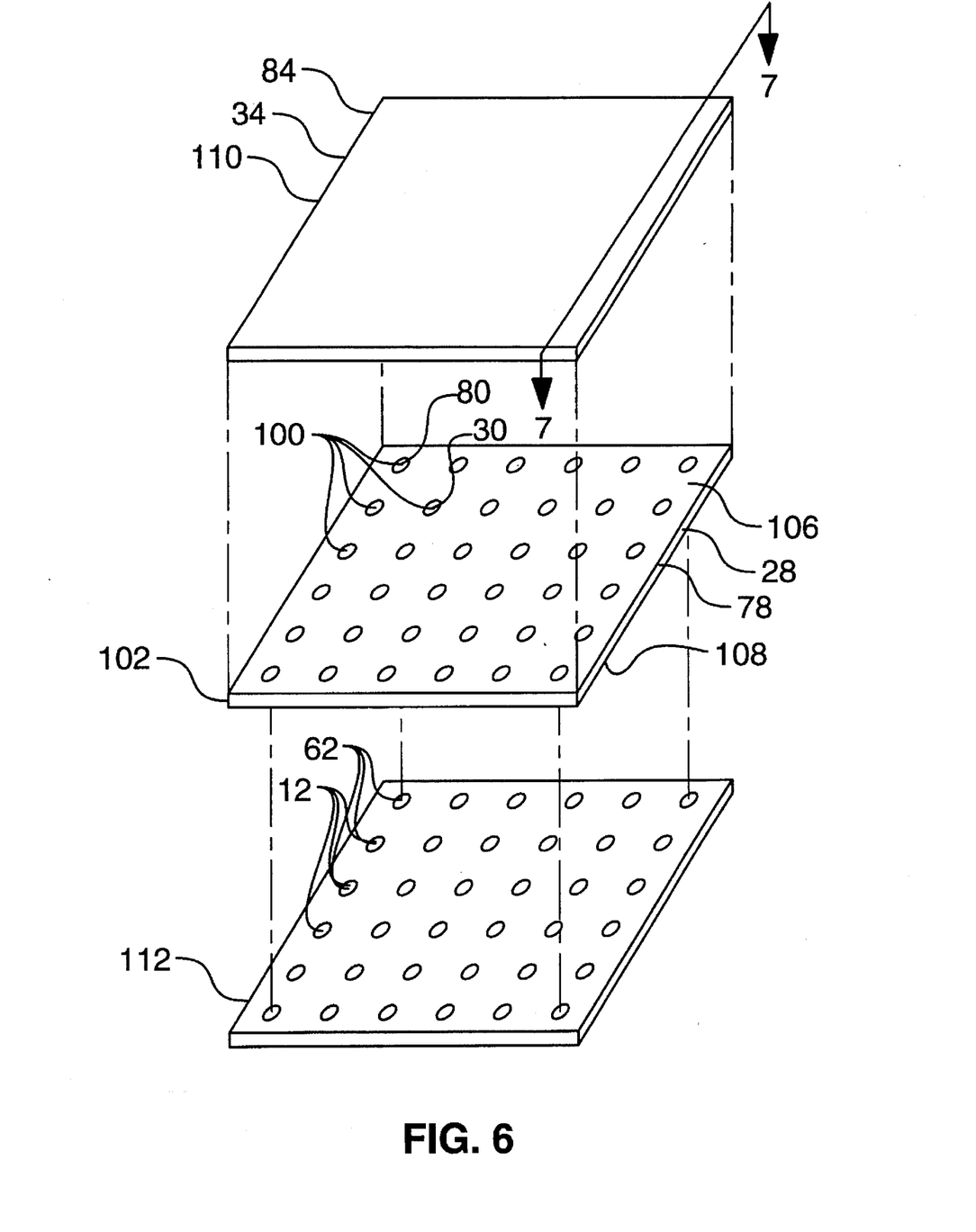
FIG. 6 is an exploded view illustrating a plurality of strain gages, a front plate having a corresponding plurality of cavities, and a back plate, for use in forming a plurality of stress sensors according to the method of the present invention.

With reference to FIG. 6, the method includes creating cavities 100 at a plurality of predetermined locations in a large metal front plate 102. Although the method of the present invention may be utilized to form any number of stress sensors, this preferred method is used to create a six-by-six array of stress sensors. Thus, the cavities 100 are arranged in a six-by-six array, with each cavity 100 corresponding to one stress sensor in a six-by-six array of stress sensors. Each cavity 100 is a cavity such as the cavity 30 (FIG. 2) of an individual stress sensor 10. Accordingly, the large front plate 102 comprises the individual front plates 28 (FIG. 2) of the individual stress sensors in the array.

Figure 7:
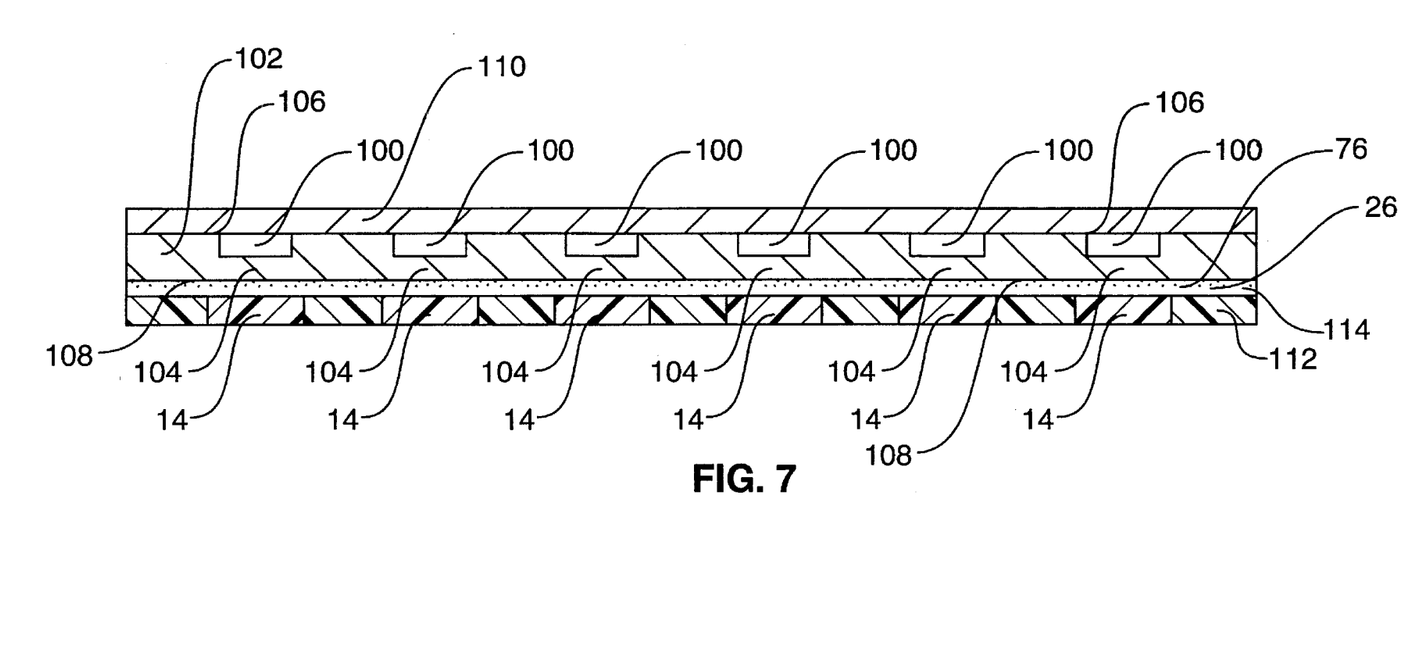
FIG. 7 is a cross-sectional side view taken along line 7—7 in FIG. 6 showing the strain gages, bond layer, front plate, and back plate after they have been assembled according to the present method.

As best illustrated in FIG. 7, each cavity 100 locally decreases the thickness of the front plate 102 to create a corresponding diaphragm 104 without also creating an orifice in the front plate 102. The resulting front plate 102 has a cavity side 106 and a diaphragm side 108 (also shown in FIG. 2).

It is presently preferred that the cavities 100 be created by an acid etching process. To accomplish such an etching process, holes are defined by an acid-resistant template such that the positions of the holes correspond to the predetermined cavity locations. The template is secured to the cavity side 106 of the front plate 102 to serve as a mask.

It is presently preferred to simultaneously define the holes and secure the template as follows. First, a pattern is formed which has pattern holes corresponding to the masking portions of the template. The pattern is formed of a plastic, of polytetrafluoroethylene, or of like material. The pattern is positioned against the front plate 102. A layer of template material is then applied to the front plate 102 through the pattern holes. One suitable template material is the M-200 material available from Micro Measurements of Raleigh, N.C. Then the pattern is removed. The pattern is configured and placed such that application of the template material through the pattern holes defines a template which leaves exposed those areas of the front plate 102 that correspond to the cavities 100.

Acid is then applied to the (unmasked) predetermined locations in the plate 102 to etch the cavities 100. In one embodiment of the present method, the cavities 100 are etched into a steel shim plate 102 as follows. A mild acid solution is deposited in each of the template holes and tended for approximately 15 minutes. One suitable acid is number 88-X8- 0547-02 available from Archer, a subsidiary of Tandy Corporation. The bottom of each cavity 100 is scraped with a sharp tool occasionally during the etching to expose bare metal to the acid.

As a particular diaphragm 104 approaches the desired thickness, the acid is removed and the thickness of the diaphragm 104 is precisely measured with a micrometer. The acid solution is reapplied in selected cavities 100 as needed until diaphragms 104 of the desired thickness are obtained. In particular, diaphragms 104 ranging in thickness from about 0.001 to about 0.004 inches are reliably obtained. Once the desired thickness is reached, further acid erosion of the front plate 102 is halted by applying an appropriate acid neutralizer. One suitable neutralizer for the 88-X8-0547-02 acid solution is the 5A neutralizer available from Micro Measurement of Raleigh, N.C.

The cavities 100 may also be produced by machining the front plate 102. However, machining the cavities 100 requires great caution to avoid warping the thin diaphragm 104 or forming a groove in the inner surface of the diaphragm 104. Warped regions, grooves, and similar irregularities contribute to lunging, rupturing, and other undesirable diaphragm behaviors.

With reference to FIG. 6, the method of the present invention also includes securing a large back plate 110 to the cavity side 106 of the large front plate 102. Thus secured, the back plate 110 covers the cavities 100. The large back plate 110 comprises an individual back plate 30 for each individual stress sensor 10 being formed. It is presently preferred that the back plate 110 comprise a metal, such as steel shim stock, and that the back plate 110 be secured to the front plate 102 by welding the two plates 102, 110 together by spot welding, resistance welding, or another similar process.

Next, the plurality of strain gages 12 is bonded to the front plate 102 with a bond layer 114 (FIG. 7). The strain gages 12 are bonded to the diaphragm side 108 of the front plate 102 with each strain gage 12 aligned over a cavity 100. It is presently preferred to utilize strain gages which are manufactured in an array 112 by conventional means and supplied for use with the present method on a sheet of material such as the flexible material sold under the mark KAPTON® by E. I. Du Pont de Nemours and Co. Given such an array 112 of gages, the locations of the cavities 100 are chosen to correspond to the positions of the active areas 14 of the strain gages 12 in the array 112. One suitable array of strain gages is available from J. P. Technologies, of Upland, Calif.

To reduce the risk that the diaphragm 104 will lunge, the bond layer 114 is formed to have a substantially uniform thickness on at least that portion of the front plate 102 where the diaphragms 104 are located. The bond layer 114 is formed of a bonding agent, and is preferably formed of a liquid bonding agent in order to obtain sufficient adhesion after the bonding agent cures.

The liquid bonding agent is applied to the front plate 102, to the array 112 of strain gages, or in both locations. After the bonding agent is applied, the strain gages 12 are placed against the front plate 102 with the gages 12 corresponding in position to the cavities 100. The bond layer 114 is thus positioned between the front plate 102 and the array 112 of strain gages.

With the stress sensor components thus positioned, a force is applied to urge the plurality of strain gages 12 and the front plate 102 toward each other while the bonding agent cures to form a solid binding matrix. To reduce cost, a mechanical compression force may be employed. However, gas pressure may also be employed by placing the components in a pressure chamber and raising the pressure to approximately 45 p.s.i.

Figure 8:
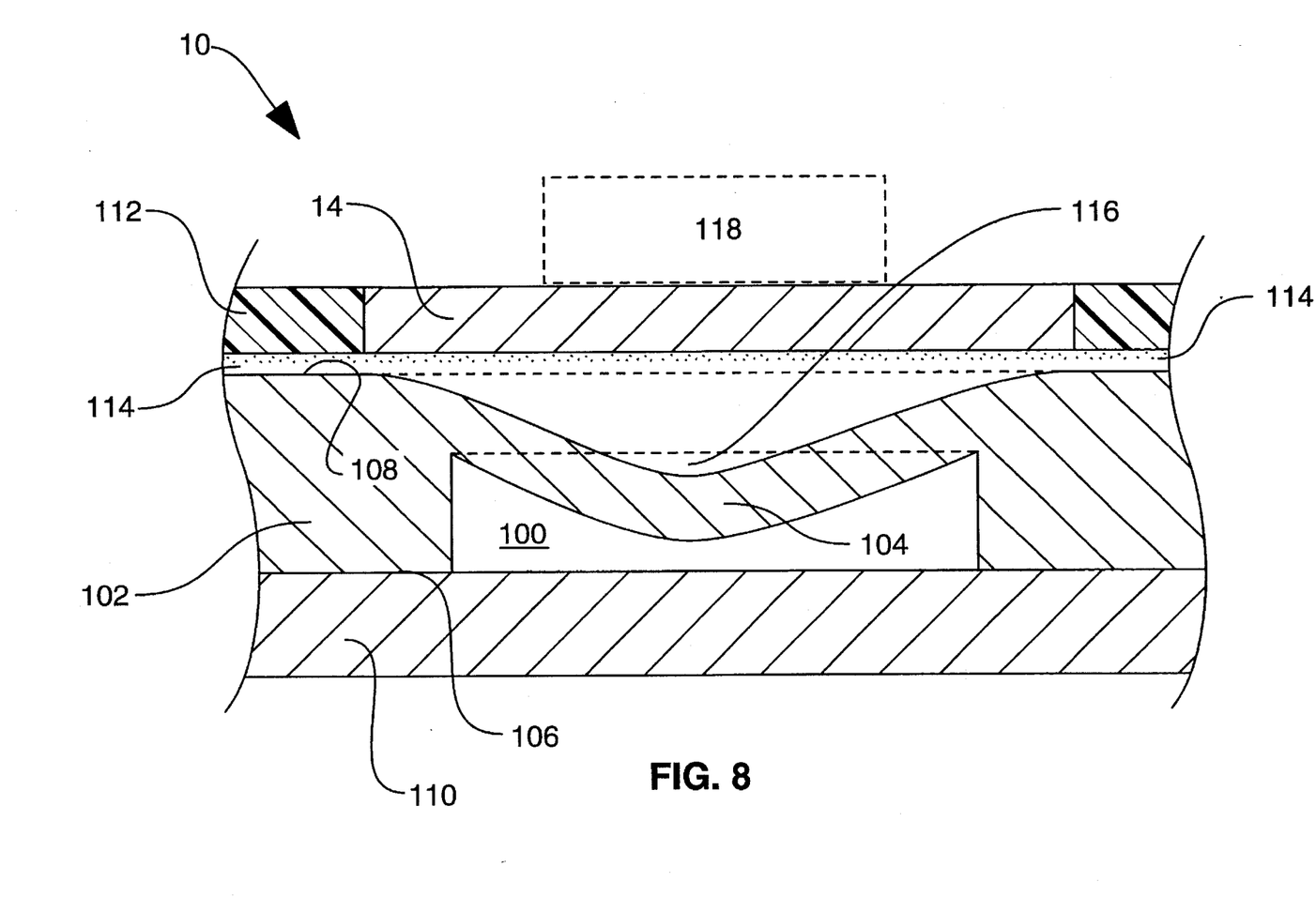
FIG. 8 is an enlarged view of a single strain gage, diaphragm, and cavity illustrating alternative positions of the diaphragm during the curing of the bond layer.

As a result of the compression force, however, the liquid bonding agent often tends to deflect the diaphragm 104 and create a pool 116 of bonding agent, as illustrated in exaggerated form in FIG. 8. Permitting the bonding agent to cure with the diaphragm 104 thus deflected results in a less than preferred embodiment of the stress sensor 10, because the bulge created by the pool 116 in the bond layer 114 often causes the diaphragm 104 to lunge during use.

To prevent such bulges in the bond layer 114, one embodiment of the present method applies magnetic force to the diaphragm 104 as the bonding agent cures. A source of magnetic force 118 (shown in phantom) is positioned over the strain gages 12. Preferably, one magnet 118 is employed per strain gage 12, but a single magnet 118 may also be positioned over several strain gages 12. Each magnet 118 is positioned on the diaphragm side 108 of the front plate 102. Each magnet 118 is further positioned such that magnetic attraction of the metal diaphragm 104 toward the source of magnetic force 118 urges the diaphragm 104 toward the position shown in phantom in FIG. 8, thereby eliminating the bulge 116.

A presently preferred source of magnetic force 118 is a rare earth magnet. In one embodiment of the present method, a rare earth magnet with a magnetic field strength of about 30,000 Gauss is positioned such that the combined force of the magnetic attraction and the compression force that urged the front plate and plurality of strain gages together is no greater than about 45 p.s.i. The mechanical compression force used in the absence of a magnetic force is in the range from about 15 p.s.i. to about 75 p.s.i., and preferably in the range from about 30 p.s.i. to about 35 p.s.i. When used in conjunction with a magnetic force, the mechanical compression force is preferably in the range from about 15 p.s.i. to about 20 p.s.i.

Those of skill in the art can readily determine the times and temperatures needed to properly cure the bonding agent. In the preferred embodiment of the present method, the bond layer 114 is formed with M-bond 610 adhesive, available from Micro Measurement of Raleigh, N.C. To form a suitable bond layer 114, M-bond 610 adhesive requires curing at about 325 degrees Fahrenheit for about two hours with a compression force of about 45 p.s.i. After initial curing, sensors 10 formed with the adhesive are cycled from ambient temperature to about 325 degrees Fahrenheit three times to stress relieve the bond layer 114.

The individual sensors 10 are then separated from one another by cutting the front plate 102, the back plate 110, and the sheet 112 of strain gages 62. It is presently preferred that cutting be performed by a rotating wheel which carries an abrasive, or by other conventional cutting means. However, punching or cutting methods which distort the sensors 10 are not preferred.

With reference to FIG. 1, the method of the present invention optionally comprises the additional step of calibrating a plurality of stress sensors 10 with an automated calibration system. An automated calibration system is an automated system which permits rapid calibration of a plurality of stress sensors as described herein. After being initially configured, an automated calibration system is capable of repeatedly applying a predetermined stress to a plurality of stress sensors more rapidly than would be possible without the system. A presently preferred automatic calibration system includes a plurality of power leads, electrical probes, and forcing members, which are all controlled by an automated controller.

The calibrating step of the method of the present invention is accomplished by contacting the electrical terminals 18 of a plurality of strain gages 12 with the power leads and electrical probes of the automated calibration system. The power leads provide appropriate electrical power inputs to the strain gages 12 and the electrical probes measure the output voltages of the strain gages 12. Multiple strain gages 12 are thus positioned to be contacted and tested during substantially the same period of time. Suitable power leads and electrical probes may be configured in conventional multichannel connectors with individual spring loaded contacts.

A predetermined electrical input is applied to the plurality of strain gages 12 via the power leads such that the strain gages 12 produce an electrical output sensed by the probes. One suitable input is provided by a five volt power supply. Next, a predetermined stress is applied to the strain gages 12 by urging the forcing members against the gages 12, thereby altering the electrical output of the gages 12. The forcing members are actuated by hydraulic, electromechanical, or other conventional means.

The automated calibration system probes sense the electrical output produced by the strain gages 12. Pressure characterizations, including temperature characterizations, are thereby measured. The electrical output produced by the strain gages 12 may be also recorded for later use, such as in creating temperature compensation resistors or in transmittal to the stress sensor's user.

After the plurality of stress sensors is formed according to the steps set forth above, individual stress sensors are cut from the plurality and packaged or otherwise configured for transport and use. Individual stress sensors are preferably packaged together with their individual calibration information, including temperature characterization for data correction purposes.

Thus, the present invention provides a method for making stress sensors which are calibrated to provide accurate stress measurements in a range that is appropriate for sensing the stresses present while composite structures are manufactured. The stress sensors 10 and 60 are configured to provide accurate stress measurements in the range from about zero to about 500 p.s.i., and particularly in the range from about zero to about 400 p.s.i. Stress sensors produced according to the method of the present invention are also thin, with the preferred embodiment illustrated in FIG. 1 providing a stress sensor that is thinner than any stress sensors known to the inventors to have substantially equal price and performance qualities. Moreover, the present method permits front plates, back plates and strain gages to be assembled and calibrated in pluralities, so that many stress sensors with these features can be formed at substantially the same time.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for making a plurality of stress sensors, comprising the steps of:

(a) creating cavities at a plurality of predetermined locations in a metal front plate, each cavity locally decreasing the thickness of the front plate to create a diaphragm in the front plate without creating an orifice in the front plate, the front plate thereby having a cavity side and a diaphragm side;

(b) securing a back plate to the cavity side of the front plate such that the cavities in the front plate are covered by the back plate;

(c) positioning a plurality of strain gages near the diaphragm side of the front plate such that the strain gages correspond in position to the locations of the cavities in the front plate; and (d) bonding the positioned plurality of strain gages to the front plate with a layer of bonding agent which has a substantially uniform thickness on at least that portion of the front plate where the diaphragms are located.

2. The method of claim 1, wherein said step of creating cavities at a plurality of predetermined locations in a metal front plate comprises the steps of:

masking the front plate outside the predetermined locations; and applying acid to the predetermined locations to etch the cavities into the plate.

3. The method of claim 1, wherein said step of securing a back plate to the cavity side of the front plate comprises welding a metal back plate to the front plate.

4. The method of claim 1, wherein said step of securing a back plate to the cavity side of the front plate comprises soldering a metal back plate to the front plate.

5. The method of claim 1, wherein said step of securing a back plate to the cavity side of the front plate comprises bonding a metal back plate to the front plate with an adhesive.

6. The method of claim 1, wherein said step of bonding the positioned plurality of strain gages to the front plate comprises the steps of:

applying a layer of liquid bonding agent to the diaphragm side of the front plate;

placing the plurality of strain gages against the layer of bonding agent; and applying a magnetic force to the diaphragms to reduce their movement toward the back plate during the curing of the liquid bonding agent.

7. The method of claim 6, wherein said step of applying a magnetic force to the diaphragms comprises positioning a rare earth magnet near the diaphragms.

8. The method of claim 6, further comprising the step of mechanically applying a force that urges the plurality of strain gages toward the front plate.

9. The method of claim 1, wherein said method further comprises the step of calibrating a plurality of the stress sensors with an automated calibration system, and said calibrating step comprises the steps of:

contacting electrical terminals of strain gages of the plurality of stress sensors with electrical probes of the automated calibration system;

applying a predetermined electrical input to the strain gages such that the strain gages produce an electrical output;

applying a predetermined stress to the strain gages to alter the electrical output produced by the strain gages; and using the automated calibration system to sense the electrical output produced by the strain gages.

10. The method of claim 9, further comprising the step of recording the electrical output produced by the strain gages.

11. A method for making a plurality of stress sensors, comprising the steps of:

(a) creating cavities at a plurality of predetermined locations in a metal front plate by applying acid to the predetermined locations to etch the cavities into the plate, each cavity locally decreasing the thickness of the front plate to create a diaphragm in the front plate without creating an orifice in the front plate, the front plate thereby having a cavity side and a diaphragm side;

(b) welding a back plate to the cavity side of the front plate such that the cavities in the front plate are covered by the back plate;

(c) positioning a plurality of strain gages near the diaphragm side of the front plate such that the strain gages correspond in position to the locations of the cavities in the front plate; and (d) bonding the positioned plurality of strain gages to the front plate with a layer of bonding agent which has a substantially uniform thickness on at least that portion of the front plate where the diaphragms are located.

12. The method of claim 11, wherein said step of bonding the positioned plurality of strain gages to the front plate comprises the steps of:

applying a layer of liquid bonding agent to the diaphragm side of the front plate;

placing the plurality of strain gages against the layer of bonding agent; and applying a magnetic force to the diaphragms to reduce their movement toward the back plate during the curing of the liquid bonding agent.

13. The method of claim 12, wherein said step of applying a magnetic force to the diaphragms comprises positioning a rare earth magnet near the diaphragms.

14. The method of claim 12, further comprising the step of mechanically applying a force that urges the plurality of strain gages toward the front plate.

15. The method of claim 11, wherein said method further comprises the step of calibrating a plurality of the stress sensors with an automated calibration system, and said calibrating step comprises the steps of:

contacting electrical terminals of strain gages of the plurality of stress sensors with electrical probes of the automated calibration system;

applying a predetermined electrical input to the strain gages such that the strain gages produce an electrical output;

applying a predetermined stress to the strain gages to alter the electrical output produced by the strain gages; and using the automated calibration system to sense the electrical output produced by the strain gages.

16. The method of claim 15, further comprising the step of recording the electrical output produced by the strain gages.

17. A method for making a plurality of stress sensors, comprising the steps of:

(a) creating cavities at a plurality of predetermined locations in a metal front plate, each cavity locally decreasing the thickness of the front plate to create a diaphragm in the front plate without creating an orifice in the front plate, the front plate thereby having a cavity side and a diaphragm side;

(b) welding a metal back plate to the front plate to the cavity side of the front plate such that the cavities in the front plate are covered by the back plate;

(c) positioning a plurality of strain gages near the diaphragm side of the front plate such that the strain gages correspond in position to the locations of the cavities in the front plate;

(d) applying a layer of liquid bonding agent to the diaphragm side of the front plate;

(e) placing the plurality of strain gages against the layer of bonding agent; and (f) applying a magnetic force to the diaphragms to reduce their movement toward the back plate during the curing of the liquid bonding agent.

18. The method of claim 17, wherein said step of creating cavities at a plurality of predetermined locations in a metal front plate comprises the steps of:

masking the front plate outside the predetermined locations; and applying acid to the predetermined locations to etch the cavities into the plate.

19. The method of claim 17, wherein said step of applying a magnetic force to the diaphragms comprises positioning a rare earth magnet near the diaphragms.

20. The method of claim 17, further comprising the step of mechanically applying a force that urges the plurality of strain gages toward the front plate.

21. The method of claim 17, wherein said method further comprises the step of calibrating a plurality of the stress sensors with an automated calibration system, and said calibrating step comprises the steps of:

contacting electrical terminals of strain gages of the plurality of stress sensors with electrical probes of the automated calibration system;

applying a predetermined electrical input to the strain gages such that the strain gages produce an electrical output;

applying a predetermined stress to the strain gages to alter the electrical output produced by the strain gages; and using the automated calibration system to sense the electrical output produced by the strain gages.

22. The method of claim 21, further comprising the step of recording the electrical output produced by the strain gages.

\* \* \* \* \*